US010331728B2

United States Patent
Hanson et al.

(10) Patent No.: US 10,331,728 B2
(45) Date of Patent: Jun. 25, 2019

(54) SYSTEM AND METHOD OF ROBOT CALIBRATION USING IMAGE DATA

(71) Applicant: General Electric Company, Schenectady, NY (US)

(72) Inventors: Gerhart LaMoyne Hanson, Simpsonville, SC (US); Martin Lewis Smith, Easley, SC (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/608,393

(22) Filed: May 30, 2017

(65) Prior Publication Data

US 2018/0350100 A1    Dec. 6, 2018

(51) Int. Cl.
  *G06F 17/10*    (2006.01)
  *G06F 16/487*   (2019.01)
  *G06T 7/73*     (2017.01)

(52) U.S. Cl.
  CPC .............. *G06F 16/487* (2019.01); *G06T 7/73* (2017.01); *G06T 2207/30204* (2013.01)

(58) Field of Classification Search
  CPC ... G06T 7/74; G06T 7/97; G06F 17/10; G06F 17/30041
  See application file for complete search history.

(56) References Cited

U.S. PATENT DOCUMENTS

| 7,359,817 | B2 | 4/2008 | Ban et al. |
|---|---|---|---|
| 7,567,272 | B2 | 7/2009 | Lohmann |
| 8,485,017 | B1 | 7/2013 | Trompeter |
| 8,989,897 | B2 | 3/2015 | de Smet |
| 9,026,249 | B2 | 5/2015 | Schaller et al. |
| 9,266,241 | B2 | 2/2016 | Trompeter |
| 2010/0262288 | A1 | 10/2010 | Svensson et al. |
| 2016/0176054 | A1 | 6/2016 | Foerster et al. |

OTHER PUBLICATIONS

Lee et al., Kinematic Calibration System of Robot Hands Using Vision Cameras, Oct. 31-Nov. 2, 2013, 2013 IEEE, 2013 10th International Conference on Ubiquitous and Ambient Intelligence (URAI), Jeju, Korea, pp. 175-177 (Year: 2013).*

* cited by examiner

*Primary Examiner* — Toan M Le
(74) *Attorney, Agent, or Firm* — Dale Davis; Hoffman Warnick LLC (57) ABSTRACT

This disclosure provides systems and methods of robot calibration using imaging data. A mounting interface attaches to the sensor module to the robot system. A robot includes at least one positioning member, at least one joint connected to the at least one positioning member, at least one actuator for moving the at least one positioning member around the at least one joint, and at least one robot reference mark on the at least one positioning member. The operating environment includes at least three environment reference marks in fixed positions relative to the robot. A camera captures a calibration image and an actual position of the robot is determined based on the robot reference mark relative to the environment reference marks to determine a calibration offset between a reference position and the actual position using the calibration image.

20 Claims, 4 Drawing Sheets

SYSTEM AND METHOD OF ROBOT CALIBRATION USING IMAGE DATA

BACKGROUND OF THE INVENTION

The disclosure relates to precision robotics and, more specifically, calibration of robotic cells for relative positioning, such as home position of an industrial robot.

Manufacturing increasingly relies on industrial robots for improved efficiency, lowering costs, and systematic control and improvement of repeated tasks, such as assembly, testing, repair, distribution, disposal, etc. Many industrial robots include computer-controlled positioning systems that precisely position and track the location of robot activities, particularly with regard to their environment (commonly a cell) and/or a work object with which they interact. A robotic cell may be defined as an integrated robotic system that includes a robot, controller, and safety environment (often an enclosure or other defined space of some sort), and may include peripherals such as part positioners and devices for moving parts in and out of the cell. During operation a work object is generally present within the cell or moving into or out of the cell, unless the cell is idle or some maintenance, recovery, calibration, or other supporting activity is underway.

Many industrial robots include one or more actuators and related axes that position one or more tools mounted to the robot for use on a work object. These actuators may be controlled by one or more position controllers and servo loops to precisely position the actuators and, thereby, the tools relative to the work object and/or peripherals or features of the work environment. For example, an industrial coating robot may include a robotic arm featuring 4-6 joints with independent servomotors, such as a rotating base joint, a base pivot joint, an elbow pivot joint, a wrist rotating joint, a wrist pivot joint, and an end effector rotating joint. Because robots may change over time, it may be useful to be able to have periodic and/or event-based calibration of an industrial robot. For example, wearing of parts, changes in dimension tolerances, component replacement, and/or crashes can all create variations in positioning that may be calibrated out or otherwise compensated for.

Calibrating an industrial robot generally includes defining a home position (0, 0, 0 in an x, y, z coordinate system), instructing the robot positioning system to navigate to a desired location, then using one or more measurement tools or gauges to determine how far the actual location is from the desired location. This process can be repeated for a number of positions relative to the various axes and actuators of the robot to determine one or more correction factors that may be applied to robot positioning commands during operation.

BRIEF DESCRIPTION OF THE INVENTION

A first aspect of this disclosure provides a system for robot calibration using image data. A robot includes at least one positioning member, at least one joint connected to the at least one positioning member, at least one actuator for moving the at least one positioning member around the at least one joint, and at least one robot reference mark on the at least one positioning member. At least three environment reference marks are in fixed positions relative to the robot. A camera is positioned to capture a calibration image including the at least one robot reference mark and the at least three environment reference marks. A calibration unit determines an actual position of the robot based on the at least one robot reference mark relative to the at least three environment reference marks and determines a calibration offset between a reference position and the actual position using the calibration image.

A second aspect of the disclosure provides a method for robot calibration using image data. A robot is disposed within an operating environment. The robot includes at least one positioning member, at least one joint connected to the at least one positioning member, at least one actuator for moving the at least one positioning member around the at least one joint, and at least one robot reference mark on the at least one positioning member. The operating environment includes at least three environment reference marks in fixed positions relative to the robot. A calibration image of the robot in the operating environment is captured using a camera and includes the at least one robot reference mark and the at least three environment reference marks. A calibration offset is determined between an actual position of the robot in the calibration image and a reference position in a reference image. The reference image includes the at least one robot reference mark and the at least three environment reference marks. A positioning controller is calibrated with the calibration offset for positioning the at least one positioning member around the at least one joint using the at least one actuator.

A third aspect of the disclosure provides a calibration unit for a robot system using image data. The calibration unit includes a reference image of the robot system including a robot within an operating environment. The robot includes at least one positioning member, at least one joint connected to the at least one positioning member, at least one actuator for moving the at least one positioning member around the at least one joint, and at least one robot reference mark on the at least one positioning member. The operating environment includes at least three environment reference marks in fixed positions relative to the robot. A camera is positioned to capture a calibration image including the at least one robot reference mark and the at least three environment reference marks. An image processor compares the calibration image to the reference image to determine an actual position of the robot based on the at least one robot reference mark relative to the at least three environment reference marks and determines a calibration offset between a reference position and the actual position. A positioning controller interface communicates the calibration offset to a positioning controller that positions the at least one positioning member around the at least one joint using the at least one actuator.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
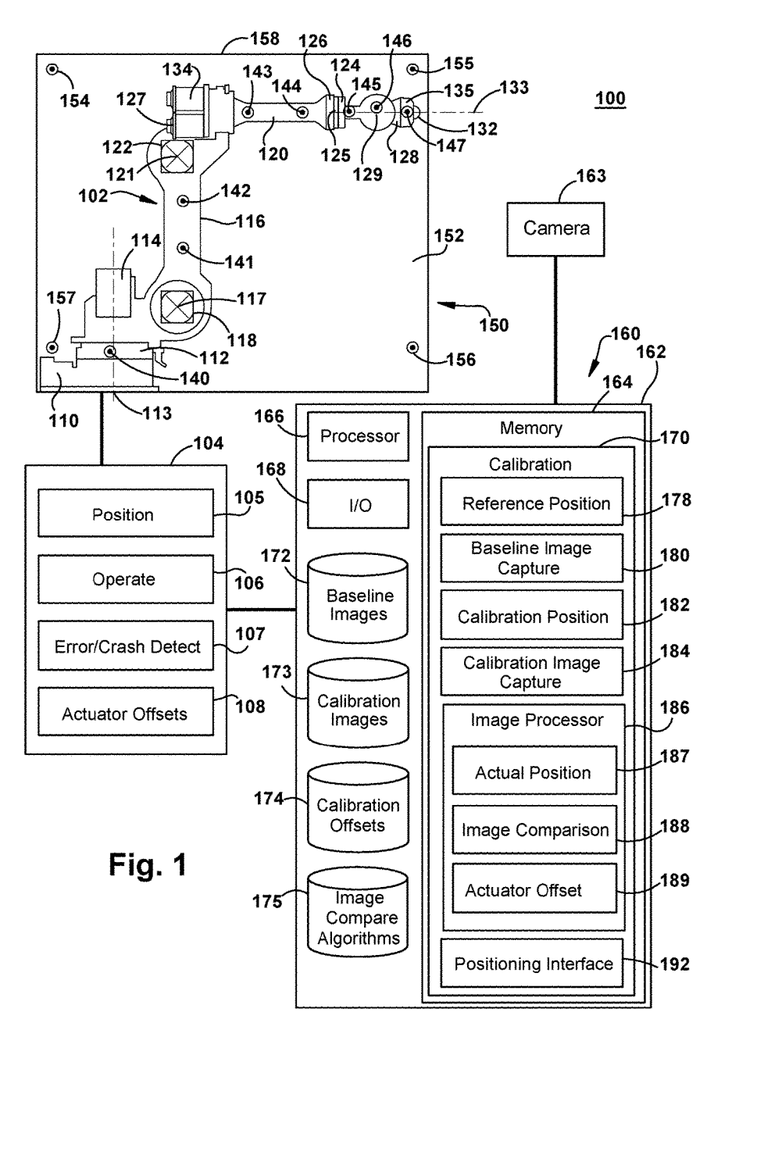
FIG. 1 shows a diagram of an example system for robot calibration using image data according to various embodiments of the disclosure.

Referring to FIG. 1, an example system 100 for calibrating a robot 102 using image data and, more specifically, providing calibrated actuator offset values for use by a robot controller 104 during operation of robot 102 is shown. In some embodiments, robot 102 may be a six axes robotic arm. Other embodiments may include a variety of industrial robots with one or more controllably actuated joints for positioning one or more members of the robot. Controller 104 may include one or more conventional control systems for operating robots, such as industrial robotic arms, and may be an independent control unit for robot 102 or an integrated robot controller or part of an industrial control system. In some embodiments, controller 104 may include a position controller 105 for sending position control signals to robot 102, operation controller 106 for sending control signals to an end effector or peripherals related to the operations robot 102 is used for, and an error/crash detector 107 for monitoring the operations of robot 102 to detect errors and crashes. Controller 104 may include actuator offsets 108 used to calibrate the position control signals sent to robot 102. For example, actuator offsets 108 may include one or more offset values for each actuator in robot 102 that has been found to have a deviation between a reference position and an actual position during a calibration operation. In some embodiments, controller 104 includes a calibration table that provides a lookup for offset values corresponding to each actuator whenever position controller 105 sends a position control signal to robot 102. In some embodiments, some or all of the functions of controller 104 may be provided on board robot 102 using an integrated computing system, such as an on board control module, with or without wireless communication to one or more user interfaces and/or remote data storage.

In some embodiments, robot 102 may include a mounting base 110 and a rotating base member 112. Rotating base member 112 may rotate around a base axis 113 using a base rotation actuator 114. A lower arm member 116 may movably connect to rotating base member 112 around a lower pivot joint 117 using a lower pivot actuator 118. An upper arm member 120 may movably connect to lower arm member 116 around an upper pivot joint 121 using an upper pivot actuator 122. Upper arm member 120 may movably connect to a rotating wrist member 124 that rotates around a roll axis 125 of upper arm member 120 at wrist roll joint 126 using wrist roll actuator 127. Rotating wrist member 124 may movably connect to a pivoting wrist member 128 that pivots around a wrist pivot joint 129 of rotating wrist member 124 using a wrist pivot actuator (not shown). Pivoting wrist member 128 may movably connect to an end effector mount 132 that rotates around an end effector roll axis 133 of pivoting wrist member 128 using end effector roll actuator 134 at end effector roll joint 135. Robot 102 is merely an example and many other configurations of robotic arms or other robot configurations are possible including at least one positioning member (such as lower arm member 116, upper arm member 120, rotating wrist member 124, pivoting wrist member 128, and end effector mount 132), at least one joint connected to the at least one positioning member (such as lower pivot joint 117, upper pivot joint 121, wrist roll joint 126, wrist pivot joint 129, end effector roll joint 135), and at least one actuator for moving the at least one positioning member around the at least one joint (such as base rotation actuator 114, lower pivot actuator 118, upper pivot actuator 122, wrist roll actuator 127, wrist pivot actuator, end effector roll actuator 134). In some embodiments, actuators 114, 118, 122, 127, 134 may each include a servo motor, such as an electric servo motor with positioning mechanics and a control loop for controllably positioning their respective members around the respective joints, and the servo motor may be control be a control signal from controller 104.

Robot 102 may include a plurality of robot reference marks 140, 141, 142, 143, 144, 145, 146, 147 on its exterior surfaces that may be used for calibration operations. For example, robot reference marks 140, 141, 142, 143, 144, 145, 146, 147 may include visual indicia applied to the surface of robot 102 in desired locations that provide sufficient contrast or unique visual patterns that are easily detected within visual image data. In some embodiments, robot reference marks 140, 141, 142, 143, 144, 145, 146, 147 may include a circle or other shape with consistent dimensions and a high contrast color relative to the surface color of robot 102, such as a red circle on yellow or a black dot on white. In some embodiments, robot reference marks 140, 141, 142, 143, 144, 145, 146, 147 may include a distinctive pattern, such as a black dot in a white circle. Other visual indicia may be used as robot reference marks 140, 141, 142, 143, 144, 145, 146, 147. These indicia may be printed, painted, adhered, machined, or otherwise placed on robot 102 to mark the desired positions for visual reference. In the embodiment shown, robot reference marks 140, 141, 142, 143, 144, 145, 146, 147 are positioned on various positioning members of robot 102 relative to their respective joints to enable the position of each joint to be determined from visual image data. Each positioning member of interest may include one or more reference marks. For example, robot reference mark 140 on rotating base member 112 enables position information and calibration offsets to be calculated for base rotation actuator 114. Robot reference marks 141, 142 on lower arm member 116 enable position information and calibration offsets to be calculated for lower pivot actuator 118. Robot reference marks 143, 144 on upper arm member 120 enable position information and calibration offsets to be calculated for upper pivot actuator 122. Robot reference mark 145 on rotating wrist member 124 enables position information and calibration offsets to be calculated for wrist roll actuator 127. Robot reference mark 146 on pivoting wrist member 128 enables position information and calibration offsets to be calculated for the wrist pivot actuator. Robot reference mark 147 on end effector mount member 132 enables position information and calibration offsets to be calculated for end effector roll actuator 134. In some embodiments, the various members may include additional surfaces with different orientations and those additional surfaces may include additional robot reference marks to enable image data to be collected from additional orientations and fields of view. In some embodiments, two reference marks may be provided per joint or axis, but a single reference mark or greater than two reference marks are also possible where surface space and imaging and processing resources permit.

In some embodiments, robot reference marks 140, 141, 142, 143, 144, 145, 146, 147 may be used with reference to additional reference marks in an operating environment 150 of robot 102. For example, operating environment 150 may include a robot cell 152 in which robot 102 operates with a plurality of environment reference marks 154, 155, 156, 157. In some embodiments, environment reference marks 154, 155, 156, 157 may be applied to one or more walls 158 of a safety enclosure for robot cell 152. In some embodiments, environment reference marks 154, 155, 156, 157 may be applied to other surfaces within operating environment 150, such as peripheral equipment, tables, mounting blocks, and other surfaces that maintain a relatively fixed position within operating environment 150. In some embodiments, one or more of environment reference marks 154, 155, 156, 157 may be mounted on a support structure (not shown), such as a stand or mounting bracket, provided for the specific purpose of positioning environment reference marks 154, 155, 156, 157. Environment reference marks 154, 155, 156, 157 may be similar to or different from robot reference marks 140, 141, 142, 143, 144, 145, 146, 147. For example, environment reference marks 154, 155, 156, 157 may be larger or smaller, use different indicia, and/or use different placement techniques. In some embodiments, environment reference marks 154, 155, 156, 157 may be larger than robot reference marks 140, 141, 142, 143, 144, 145, 146, 147 and/or include a pattern that is visibly distinct at a greater distance than robot reference marks 140, 141, 142, 143, 144, 145, 146, 147. Environment reference marks 154, 155, 156, 157 may include visual indicia applied to any visible surface within operating environment 150 in desired locations that provide sufficient contrast or unique visual patterns that are easily detected within visual image data. In some embodiments, environment reference marks 154, 155, 156, 157 may include a circle or other shape with consistent dimensions and a high contrast color relative to the surface colors in operating environment 150. In some embodiments, environment reference marks 154, 155, 156, 157 may include a distinctive pattern, such as a black dot in a white circle. Other visual indicia may be used as environment reference marks 154, 155, 156, 157. These indicia may be printed, painted, adhered, machined, or otherwise placed in operating environment 150 to mark the desired positions for visual reference. In some embodiments, at least three reference marks are provided in operating environment 150 and greater than three reference marks may increase the flexibility and accuracy of calibrations using image date. For example, environment reference marks 154, 155, 156, 157 provide four reference marks and only three need to be in the field of view of a given image to calculate position information, such that a camera position, robot position, or peripheral that blocks one of environment reference marks 154, 155, 156, 157, does not prevent calculation of accurate position information. Additional reference marks in operating environment 150, including providing reference marks on different surfaces and orientations, may further increase flexibility and accuracy of calibration calculations.

In some embodiments, a calibration unit 160 may include a computing system 162. Computing system 162 may provide a system and user interface for calculating calibration offsets for robot 102 and controller 104 using visual data from a camera 163. In some embodiments, computing system 162 is a general purpose computing devices, such as a personal computer, work station, mobile device, or an embedded system in an industrial control system (using general purpose computing components and operating systems). In some embodiments, computing system 162 may be a specialized data processing system for the task of calibrating system 100. Computing system 162 may include at least one memory 164, processor 166, and input/output (I/O) interface 168 interconnected by a bus (not shown). Further, computing system 162 may include communication with external I/O device/resources and/or storage systems, including connected system, such controller 104, camera 163, and network resources. In general, processor 166 executes computer program code, such as calibration module 170, that is stored in memory 164 and/or a storage system. While executing computer program code, processor 166 can read and/or write data to/from memory 164, storage systems, and I/O devices (through I/O interface 168). The bus provides a communication link between each of the components within computing system 162. I/O devices may comprise any device that enables a user to interact with computing system 162 (e.g., keyboard, pointing device, display, etc.). Computing system 162 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc. In some embodiments, computing system 162 is a laptop computer in communication with controller 104 via a wired (serial, USB, Ethernet, etc.) or wireless (802.11, Bluetooth, etc.) connection and running application software for calibrating system 100. In some embodiments, some or all of the functions of computing system 162 may be on board robot 102 using an integrated computing system, such as an on board control module, with or without wireless communication to one or more user interfaces and/or remote data storage.

In some embodiments, computing system 162 may include one or more application programs, data sources, and/or functional modules for calibrating robot 102 through controller 104. For example, computing system 162 may include a calibration module 170 and supporting data sources 172, 173, 174, 175 that support the functions, processes, and sub-modules of calibration module 170. Calibration module 170 may provide various processes for capturing a reference image and a calibration image, then processing those images to extract and compare position information for robot 102 to calculate one or more offsets for controller 104. Calibration module 170 may store, access, read, modify, or otherwise use data sources 172, 173, 174, 175. For example, reference images data source 172 may be used to store and retrieve one or more reference images related to robot 102 in one or more reference positions and captured at one or more reference times. Calibration images data source 173 may be used to store and retrieve one or more calibration images related to robot 102 in one or more calibration positions and captured at one or more calibration times. Calibration offsets data source 174 may be used to store and retrieve one or more calibration offsets for the actuators of robot 102 determined at one or more calibration times. Image compare algorithms 175 may include one or more image comparison algorithms, such as a three dimensional image comparison for calculating the relative positions of reference marks from image data, such as reference images and calibration images. One or more functions, processes, and sub-modules of calibration module 170 may interact with controller 104 and/or camera 163 via I/O interface 168. Camera 163 may be selected from a variety of image data collectors, such as a digital camera or other image sensor, using visible light or another portion of the electromagnetic spectrum, such as infrared or ultraviolet imaging, to create an image that may be stored and processed as image data by calibration module 170.

In some embodiments, calibration module 170 may include a reference position process 178 that communicates a command to robot 102 and/or controller 104 to drive the actuators to a defined reference position. For example, reference position process 178 may issue a command to controller 104 to return robot 102 to the home position. In some embodiments, reference position process 178 may include a plurality of selectable reference positions for different calibration options. In some embodiments, calibration module 170 may include a reference image capture process 180 that captures or retrieves a reference image of robot 102 in a reference position for use in subsequent calibrations. For example, reference image capture process 180 may issue a command to camera 163 to capture an image of robot 102. In some embodiments, reference image capture process 180 may determine whether a previously captured reference image is available in reference images data source 172 and, if so, it may retrieve the stored reference image for use in the subsequent calibration, if not, it may use camera 163 to capture a new reference image of robot 102 and store it in reference images data source 172. In some embodiments, processes 178, 180 are executed proximate the time robot 102 is put into service and/or mechanically calibrated and validated to assure that the reference image or images accurately reflect a baseline image of the desired calibrated state of robot 102. In some embodiments, calibration module 170 may include a calibration position process 182 that communicates a command to robot 102 and/or controller 104 to drive the actuators to a defined calibration position. For example, calibration position process 182 may issue a command to controller 104 to return robot 102 to the home position. In some embodiments, calibration position process 128 may include a plurality of selectable calibration positions for different calibration options, each corresponding to an available reference position with a corresponding reference image in reference images data source 172. In some embodiments, calibration module 170 may include a calibration image capture process 184 that captures or retrieves a calibration image of robot 102 in a calibration position for use in the present calibration. For example, calibration image capture process 184 may issue a command to camera 163 to capture an image of robot 102. In some embodiments, calibration image capture process 180 may store each calibration image in calibration images data source 173. In some embodiments, processes 182, 184 are executed each time a new calibration is conducted.

In some embodiments, calibration module 170 may include an image processor 186 that extracts position information, such as the relative positions of one or more members and actuators of robot 102, from image data, such as reference images in reference images data source 172 and calibration images in calibration images data source 173. For example, a three dimensional image comparison algorithm may identify each reference mark present in the target image and identify each reference mark as either a robot reference mark or an environment reference mark. Comparison of the environment reference marks may enable the image comparison to correct for differences in camera position and then each robot reference mark from the reference image may be compared to each corresponding robot reference mark in the calibration image and deviations between the two positions (reference position in the reference image and actual position in the calibration image). Image processor 186 may convert the deviations between the images into quantified physical differences that can be compensated for by applying offset values to one or more actuators of robot 102. In some embodiments, image processor 186 may include one or more image comparison algorithms, such as a three dimensional image comparison application with one or more image processing algorithms, stored in and retrieved from image compare algorithms data source 175. In some embodiments, image processor 186 may include an actual position calculator 187 that calculates the actual position of robot 102 from the calibration image using some or all of robot reference marks 140, 141, 142, 143, 144, 145, 146, 147 with reference to environment reference marks 154, 155, 156, 157. Image processor 186 may include an image comparison calculator 188 that compares the calibration image to the reference image using at least three of environment reference marks 154, 155, 156, 157 to compensate for any variations in camera position and then determines any variations in the positions of robot reference marks 140, 141, 142, 143, 144, 145, 146, 147 between the compared images. In some embodiments, image processor 186 includes an actuator offset calculator 189 that calculates physical differences and/or actuator offsets from the variations in positions of robot reference marks 140, 141, 142, 143, 144, 145, 146, 147 determined by image comparison calculator 188. For example, actuator offset calculator 189 may include a scaling function based on physical parameters of robot 102 and/or operating environment 150 and/or their respective reference marks. In some embodiments, image processor 186 may determine calibration offsets to be used by controller 104 and store them in calibration offsets data source 174.

In some embodiments, calibration module 170 may include a positioning interface 192 that communicates calibration offsets to controller 104 for use by positioning controller 105. For example, positioning interface 192 may be invoked after a calibration is complete and send the most recent calibration offsets from calibration offsets data source 174 to controller 104 via I/O interface 168 to be stored in actuator offsets 108 and used by positioning controller 105 to control the actuators of robot 102. In some embodiments, positioning interface 192 enables controller 104 to query calibration module 170 and/or the stored actuator offsets in calibration offsets data source 174 to receive updated calibration values on demand.

Figure 2:
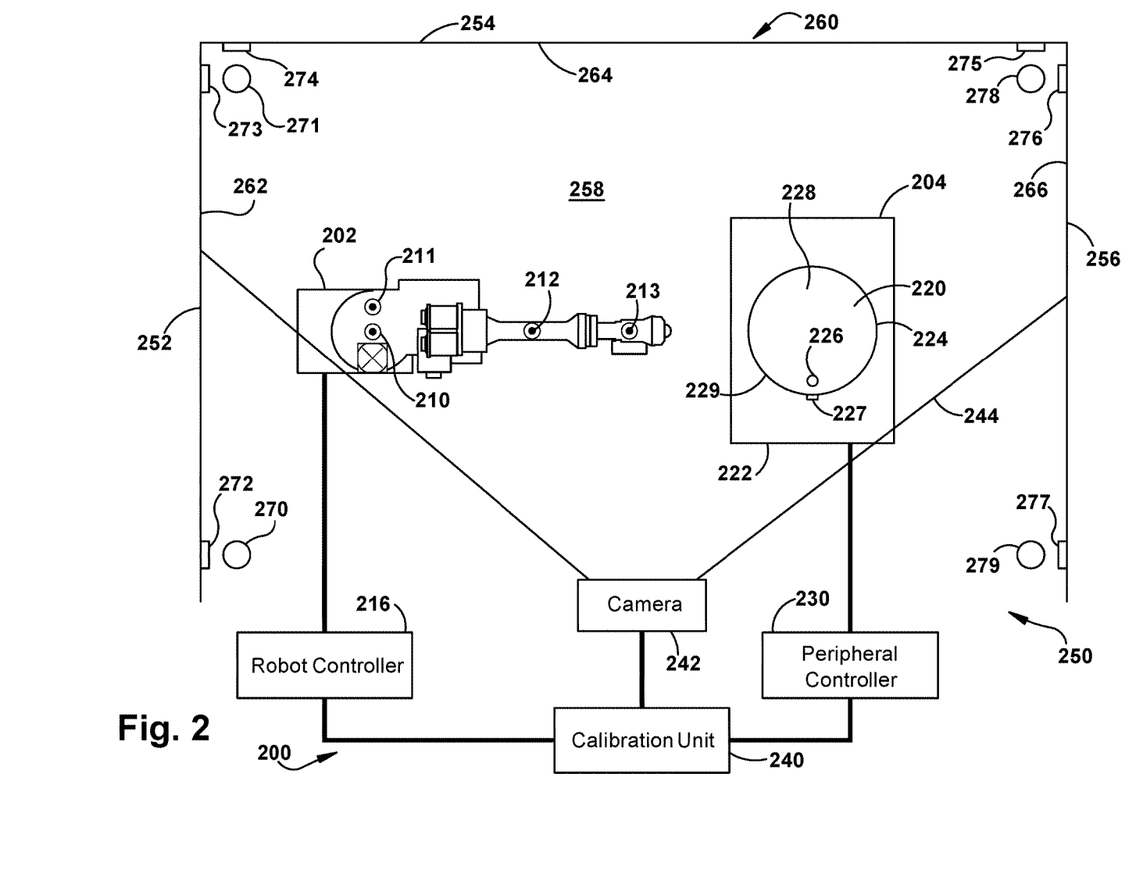
FIG. 2 shows an overhead view of an example system for robot calibration using image data according to various embodiments of the invention.

Referring to FIG. 2, an overhead view of an example robot calibration system 200 is shown with a robot 202 and a peripheral system 204 in an operating environment 206. Robot 202 may be similar to robot 102 (FIG. 1) and include robot reference marks 210, 211, 212, 213. Robot reference marks 210, 211, 212, 213 are applied to upward oriented surfaces of robot 202 and additional reference marks (not shown) may be on the laterally oriented surfaces of robot 202, similar to those shown and described for robot 102. Robot 202 may be connected to and controlled by a robot controller 216 similar to controller 104 (FIG. 1). Operating environment 206 also includes peripheral system 204 that may interact with robot 202 during various operations. For example, peripheral system 204 may include a work piece positioning system 220 including a mounted base 222 and a turntable 224. Peripheral system 204 may include a peripheral reference marks 226, 227 that may be used similarly to robot reference marks 210, 211, 212, 213 for calibrating turntable 224. Peripheral reference marks 226, 227 include an upward oriented peripheral reference mark 226 on a top surface 228 of turntable 224 and a laterally oriented peripheral reference mark 227 on lateral surface 229 of turntable 224. Peripheral system 204 may be connected to and controlled by a peripheral controller 230 that operates similarly to controller 104 (FIG. 1). A calibration unit 240 may be connected to robot controller 216, peripheral controller 230, and camera 232. Calibration unit 240 may operate similarly to calibration unit 160 in FIG. 1. In some embodiments, calibration unit 240 may include separate calibration modules and related data sources for robot 202 and peripheral system 204 and independently provide calibration offsets to the two systems. Calibration unit 240 may use image data and, more specifically, calibration images captured by camera 242 in field of view 244.

In some embodiments, operating environment 206 may include a robot cell 250 defined by a plurality of walls 252, 254, 256 and a floor 258. For example, walls 252, 254, 256 may define a safety area in which robot 202 and peripheral system 204 are positioned and operate. Operating environment 206 may include a number of reference marks on various surfaces of robot cell 250. For example, walls 252, 254, 256 may be arranged in a substantial U-shape with inward facing surfaces 262, 264, 266 that face into the operating area of robot 202 and peripheral system 204 and may be visible to camera 242 when capturing an image of robot 202 and/or peripheral system 204. Each of walls 252, 254, 256 may include at least two reference marks and may, in some cases, include four or more. Wall 252 may include environment reference marks 272, 273 on surface 262. Wall 254 may include environment reference marks 274, 275 on surface 264. Wall 256 may include environment reference marks 276, 277 on surface 266. In some embodiments, environment reference marks 272, 273, 274, 275, 276, 277 are adjacent the corners of their respective walls 252, 254, 256. For example, each reference mark may be placed one foot in and one foot up or down from each corner. Floor 258 may also include a floor surface 260 to which robot 202 and peripheral system 204 may be mounted. Floor 258 may include a plurality of environment reference marks 270, 271, 278, 279 in the corners of robot cell 250. Environment reference marks 270, 271, 272, 273, 274, 275, 276, 277, 278, 279 may be similar to environment reference marks 154, 155, 156, 157 in FIG. 1.

Figure 3:
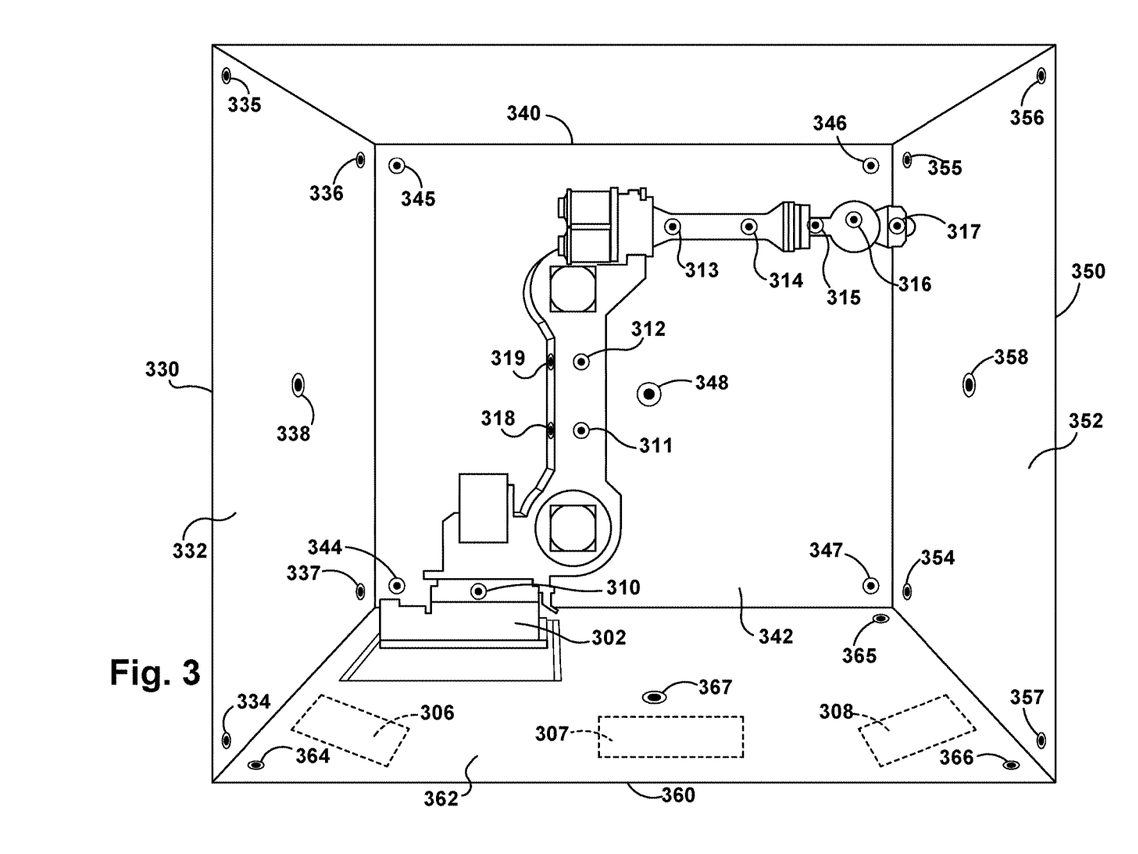
FIG. 3 shows a perspective view of an example environment and robot according to various embodiments of the invention.

Referring to FIG. 3, a perspective view of an example robot cell 300 is shown with a robot 302, such as may be used with systems 100, 200 in FIGS. 1 and 2. Robot 302 may be similar to robot 102 (FIG. 1) and include robot reference marks 310, 311, 312, 313, 314, 315, 316, 317, 318, 319. Robot reference marks 310, 311, 312, 313, 314, 315, 316, 317 are applied to laterally oriented surfaces of robot 302 facing the viewer. Robot reference marks 318, 319 are on an adjacent laterally oriented surface of robot 302, perpendicular to robot reference marks 311, 312. Robot 302 may be connected to and controlled by a robot controller (not shown) similar to controller 104 (FIG. 1). A calibration unit (not shown) may be connected to the robot controller 216 and a camera (not shown). The calibration unit and camera may operate similarly to calibration unit 160 in FIG. 1. Robot cell 300 shows three different example camera positions 306, 307, 308. A camera for capturing calibration images may be moveably placed and moved between cameral positions 306, 307, 308. Other camera locations (not shown) may include different elevations, angles, and fields of view.

In some embodiments, robot cell 300 may be defined by a plurality of walls 330, 340, 350 and a floor 360. For example, walls 330, 340, 350 may define a safety area in which robot 302 is positioned and operates and may have other functions, such as containment, screening, or process organization. Robot cell 300 may include a number of reference marks on various surfaces of walls 330, 340, 350 and floor 360. For example, walls 330, 340, 350 may be arranged in a substantial U-shape with inward facing surfaces 332, 342, 352 that face into the operating area of robot 302 and may be visible to a camera in one or more camera positions 306, 307, 308 when capturing an image of robot 302. Each of walls 330, 340, 350 and floor 360 may include three or more reference marks and, in the embodiment shown, include five reference marks (although only four reference marks are visible on floor 360 due to the position of robot 302). Wall 330 may include environment reference marks 334, 335, 336, 337, 338 on surface 332. Wall 340 may include environment reference marks 344, 345, 346, 347, 348 on surface 342. Wall 350 may include environment reference marks 354, 355, 356, 357, 358 on surface 352. Floor 360 may include environment reference marks 364, 365, 366, 367 on surface 352 (an additional reference mark may be present in the corner behind the base of robot 302). In some embodiments, the reference marks on each of walls 330, 340, 350 and floor 360 may be positioned adjacent the corners and one proximate the middle of each wall (or floor). For example, each corner reference mark may be placed approximately one foot (or by another predetermined distance) in from each corner and the center reference mark may be placed equidistant from each corner of that wall (or the section of floor within robot cell 300). Environment reference marks 334, 335, 336, 337, 338, 344, 345, 346, 347, 348, 354, 355, 356, 357, 358, 364, 365, 366, 367 may be similar to environment reference marks 154, 155, 156, 157 in FIG. 1.

Figure 4:
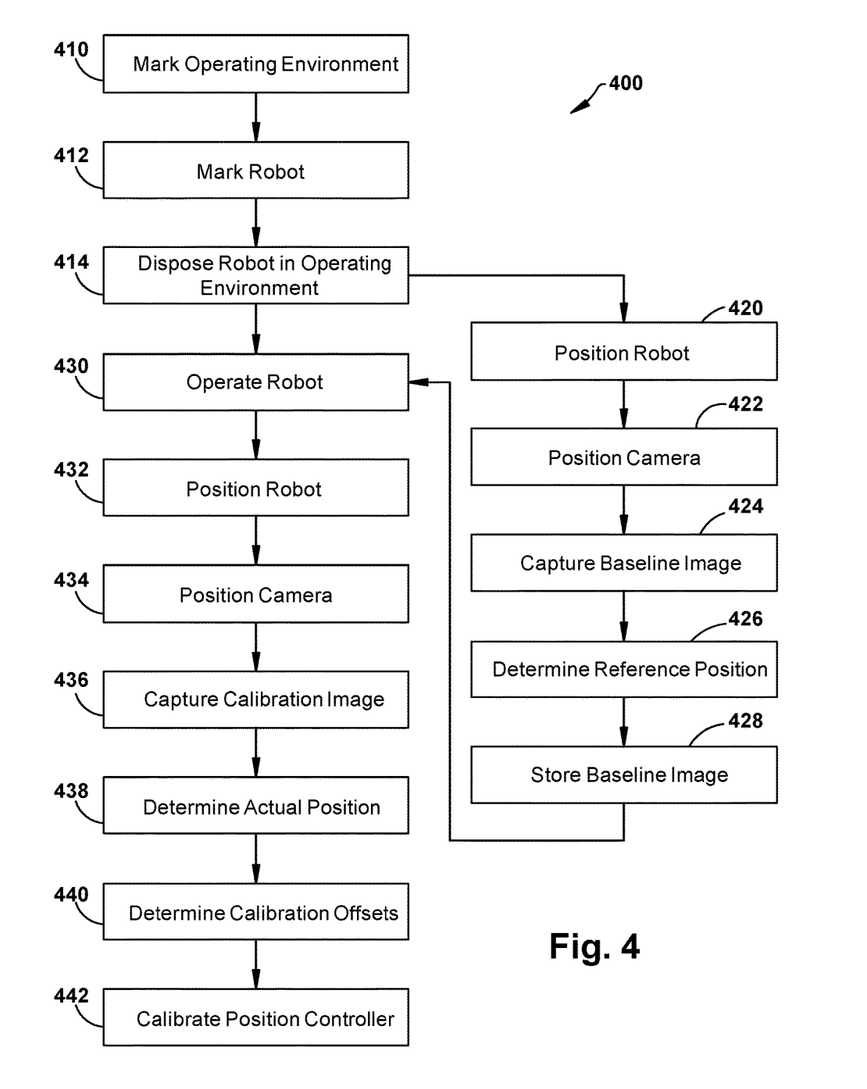
FIG. 4 shows an example method for robot calibration using image data according to various embodiments of the invention.

Referring to FIG. 4, a method 400 of calibrating a robot, such as robots 102, 202, 302 in FIGS. 1, 2, 3. In process 410, the operating environment of the robot is marked with environment reference marks. For example, at least three environment reference marks may be placed in fixed positions within the operating environment, such as adhered to the walls of a robot cell, such that they are visible from at least one perspective when the robot is in a calibration position. In process 412, the robot is marked with robot reference marks. For example, at least one robot reference mark may be added to each positionable member with a corresponding actuator of interest. In process 414, the robot is disposed within the operating environment. Note that processes 410, 412, 414 may be completed in any order with an end result that a robot with robot reference marks is positioned within an operating environment with environment reference marks. In some embodiments, a reference image may already exist for the configuration of robot, robot reference marks, operating environment, and environment reference marks and method 400 may proceed to process 430. In some embodiments, a reference image may need to be captured and stored and method 400 may proceed to process 420.

Prior to calibrating the robot, a reference image may need to be captured and stored for later use. In some embodiments, capturing a reference image may only need to be done once for a given reference position and some robots will use only a single reference position. In process 420, the robot is positioned in a reference position. For example, the robot may be commended to a home position or another known orientation of one or more actuators of interest. In process 422, a camera may be positioned in or adjacent the operating environment in such a way that at least one robot reference mark and at least three environment reference marks are in the field of view of the camera. For example, the camera may be positioned just outside a robot cell with a wide field of view that includes the entire robot (at least the surfaces oriented toward the camera) and one or more robot cell walls with environment reference marks. In process 424, a reference image may be captured by the camera. For example, one or more digital images of the robot and operating environment may be captured. In process 426, a reference position is determined from the reference image. For example, the image processor of a calibration system may identify the position of each environment reference mark and the position of each robot reference mark within the reference image. In process 428, the reference image and/or reference position are stored for later use. For example, the reference image may be stored in a reference image data source and the reference position may be stored in an accompanying data table. Once a reference image has been captured and stored, method 400 may proceed to process 430 to operate and periodically calibrate the robot.

In process 430, the robot is operated in accordance with its industrial function until such time as a calibration is called for. For example, the robot may be subject to periodic calibrations in accordance with a maintenance schedule, continue operation until an error is detected in its operations or resulting work product, and/or continue operation until there is a risk event, such as a crash, that suggests the need for a recalibration. In process 432, the robot is positioned in a calibration position that corresponds to a reference position that is available in a reference image. For example, the robot may be commanded to return to a home position or another known configuration corresponding to an available reference position. In process 434, a camera may be positioned in or adjacent the operating environment in such a way that at least one robot reference mark and at least three environment reference marks are in the field of view of the camera. For example, the camera may be positioned in a position similar to that used to capture the reference image, though it may not be necessary to be positioned in the identical position. In process 436, a calibration image may be captured by the camera. For example, one or more digital images of the robot and operating environment may be captured. In process 438, an actual position may be determined for the robot in the calibration image. For example, the image processor of a calibration system may identify the position of each environment reference mark and the position of each robot reference mark within the calibration image. In process 440, calibration offsets may be determined for one or more actuators of the robot. For example, the reference image and the calibration image may be compared and normalized to one another based upon the environment reference marks and deviations between corresponding robot reference marks. These deviations may then be scaled to determine a calibration offset value for the effected actuators. In process 442, a position controller for the robot is calibrated based on the calibration offsets. For example, calibration offset values from the calibration system may be communicated through an interface to the position controller for the robot and those calibration offsets will be used when operating the robot going forward. Method 400 may proceed back to process 430 and operate the robot until the calibration is triggered again.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
   a robot including at least one positioning member, at least one joint connected to the at least one positioning member, at least one actuator for moving the at least one positioning member around the at least one joint, and at least one robot reference mark on the at least one positioning member;
   at least three environment reference marks in fixed positions relative to the robot;
   a camera positioned to capture a three dimensional calibration image including the at least one robot reference mark and the at least three environment reference marks; and
   a calibration unit that determines an actual position of the robot based on the at least one robot reference mark relative to the at least three environment reference marks and determines a calibration offset between a reference position and the actual position using a three dimensional reference image of the robot in a home position for the reference position and the three dimensional calibration image.

2. The system of claim 1, wherein the at least one positioning member includes a plurality of positioning members, each of the plurality of positioning members having:
   at least one joint connected to the positioning member;
   at least one actuator for moving the positioning member around the at least one joint; and,
   at least one robot reference mark,
   wherein, the calibration unit determines the actual position of the robot for each of the plurality of positioning members using the at least one robot reference mark on each of the plurality of positioning members.

3. The system of claim 1, wherein the at least one positioning member includes a plurality of robot reference marks and the calibration unit uses at least two of the plurality of robot reference marks to determine the actual position of the at least one positioning member.

4. The system of claim 1, wherein the at least one positioning member includes a plurality of surfaces having different orientations and the at least on robot reference mark includes at least one robot reference mark on each of at least two surfaces of the plurality of surfaces.

5. The system of claim 1, further comprising a robot cell in which the robot operates and wherein the at least three environment reference marks are attached to the robot cell.

6. The system of claim 5, wherein the robot cell includes a plurality of cell walls and each of the cell walls includes at least three environment reference marks.

7. The system of claim 1, wherein the at least three environment reference marks are on a support surface that supports the robot and the camera is positioned opposite the support surface and has a field of view including at least a portion of the support surface and the robot.

8. The system of claim 1, wherein the camera is movably positioned relative to the robot and the at least three environment reference marks.

9. The system of claim 1, wherein the calibration unit uses a three dimensional image comparison algorithm to determine the calibration offset between the three dimensional reference image and the three dimensional calibration image.

10. The system of claim 1, further comprising a positioning controller that controls the at least one actuator during operation of the robot, wherein the calibration offset is used by the positioning controller to position the robot.

11. The system of claim 1, further comprising at least one peripheral system selected from a secondary robot, a workpiece positioning system, or an end effector tool, wherein the at least one peripheral system includes at least one peripheral reference mark and the calibration unit determines an actual peripheral position and a peripheral calibration offset.

12. A method comprising:
   disposing a robot within an operating environment, the robot including at least one positioning member, at least one joint connected to the at least one positioning member, at least one actuator for moving the at least one positioning member around the at least one joint, and at least one robot reference mark on the at least one positioning member, and the operating environment including at least three environment reference marks in fixed positions relative to the robot;
   capturing a three dimensional calibration image of the robot in the operating environment using a camera, the three dimensional calibration image including the at least one robot reference mark and the at least three environment reference marks;
   determining a calibration offset between an actual position of the robot in the three dimensional calibration image and a reference position in a three dimensional reference image including the at least one robot reference mark and the at least three environment reference marks; and
   calibrating a positioning controller with the calibration offset for positioning the at least one positioning member around the at least one joint using the at least one actuator.

13. The method of claim 12, further comprising capturing and storing the three dimensional reference image of the robot in the operating environment in a home position for use in determining the calibration offset.

14. The method of claim 13, further comprising moving the robot to the home position prior to capturing the three dimensional calibration image.

15. The method of claim 12, further comprising providing the operating environment, wherein the operating environment includes a robot cell in which the robot operates and wherein the at least three environment reference marks are attached to the robot cell.

16. The method of claim 12, further comprising positioning the camera prior to capturing the calibration image, where positioning is relative to the robot and provides a field of view that includes the at least one robot reference mark and the at least three environment reference marks.

17. The method of claim 12, wherein determining the calibration offset includes using a three dimensional image comparison algorithm to determine the calibration offset between the three dimensional reference image and the three dimensional calibration image.

18. The method of claim 12, wherein the at least one positioning member includes a plurality of positioning members, each of the plurality of positioning members having:
   at least one joint connected to the positioning member;
   at least one actuator for moving the positioning member around the at least one joint; and,
   at least one robot reference mark,
   wherein determining the calibration offset includes determining offset values for each of the plurality of positioning members using the at least one robot reference mark on each of the plurality of positioning members.

19. A calibration unit for a robot system comprising:
   A three dimensional reference image of the robot system including a robot within an operating environment, the robot including at least one positioning member, at least one joint connected to the at least one positioning member, at least one actuator for moving the at least one positioning member around the at least one joint, and at least one robot reference mark on the at least one positioning member, and the operating environment including at least three environment reference marks in fixed positions relative to the robot:
   a camera positioned to capture a three dimensional calibration image including the at least one robot reference mark and the at least three environment reference marks;
   an image processor that compares the three dimensional calibration image to the three dimensional reference image to determine an actual position of the robot based on the at least one robot reference mark relative to the at least three environment reference marks and determine a calibration offset between a reference position and the actual position;

a positioning controller interface that communicates the calibration offset to a positioning controller that positions the at least one positioning member around the at least one joint using the at least one actuator.

20. The calibration unit of claim 19, wherein the at least one positioning member includes a plurality of positioning members, each of the plurality of positioning members having:
   at least one joint connected to the positioning member;
   at least one actuator for moving the positioning member around the at least one joint; and,
   at least one robot reference mark,
   wherein the image processor determines offset values for each of the plurality of positioning members using the at least one robot reference mark on each of the plurality of positioning members, and the positioning controller interface communicates the offset values to the positioning controller.

\* \* \* \* \*